United States Patent
Moon et al.

(10) Patent No.: US 8,837,372 B2
(45) Date of Patent: Sep. 16, 2014

(54) METHOD FOR DECODING CONTROL INFORMATION OF TERMINAL IN CARRIER AGGREGATION SYSTEM AND TERMINAL THEREOF

(75) Inventors: Sung Ho Moon, Anyang-si (KR); Jae Hoon Chung, Anyang-si (KR); Seung Hee Han, Anyang-si (KR); So Yeon Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 183 days.

(21) Appl. No.: 13/582,518

(22) PCT Filed: Mar. 4, 2011

(86) PCT No.: PCT/KR2011/001520
§ 371 (c)(1),
(2), (4) Date: Nov. 19, 2012

(87) PCT Pub. No.: WO2011/108892
PCT Pub. Date: Sep. 9, 2011

(65) Prior Publication Data
US 2013/0064193 A1    Mar. 14, 2013

Related U.S. Application Data

(60) Provisional application No. 61/310,702, filed on Mar. 4, 2010.

(30) Foreign Application Priority Data

Nov. 10, 2010    (KR) .................. 10-2010-0111256

(51) Int. Cl.
*H04Q 7/00*    (2006.01)
*H04Q 7/24*    (2006.01)

(52) U.S. Cl.
USPC ........................................ 370/328; 370/338

(58) Field of Classification Search
None
See application file for complete search history.

(56) References Cited

U.S. PATENT DOCUMENTS

| | | | |
|---|---|---|---|
| 8,433,251 B2 * | 4/2013 | Chen et al. ............... 455/68 |
| 2005/0190728 A1 | 9/2005 | Han et al. |
| 2007/0064666 A1 | 3/2007 | Kwun et al. |
| 2010/0322158 A1 * | 12/2010 | Lee et al. ............... 370/329 |
| 2011/0081913 A1 * | 4/2011 | Lee et al. ............... 455/450 |
| 2011/0141985 A1 * | 6/2011 | Larsson et al. ......... 370/329 |
| 2011/0228724 A1 * | 9/2011 | Gaal et al. ............. 370/328 |
| 2011/0310818 A1 * | 12/2011 | Lin et al. ............... 370/329 |

FOREIGN PATENT DOCUMENTS

| | | |
|---|---|---|
| JP | 2007-531386 | 11/2007 |
| WO | 2008/147059 | 12/2008 |

* cited by examiner

*Primary Examiner* — Hong Cho
(74) *Attorney, Agent, or Firm* — Lee, Hong, Degerman, Kang & Waimey

(57) ABSTRACT

Provided is a method of decoding control information of a terminal in a carrier aggregation system. The method includes: receiving downlink control information including a carrier indication field from a base station; and decoding the downlink control information, wherein the downlink control information includes at least two or more fields, and a component carrier indicated by a value of the carrier indication field is determined according to a value of a specific field among the at least two or more fields.

11 Claims, 17 Drawing Sheets

FIG. 9
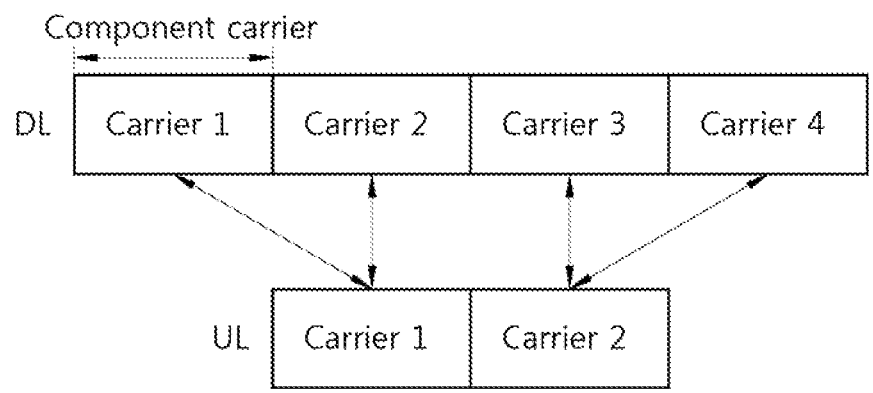
(a) # of DL CC (component carrier) ># of UL CC
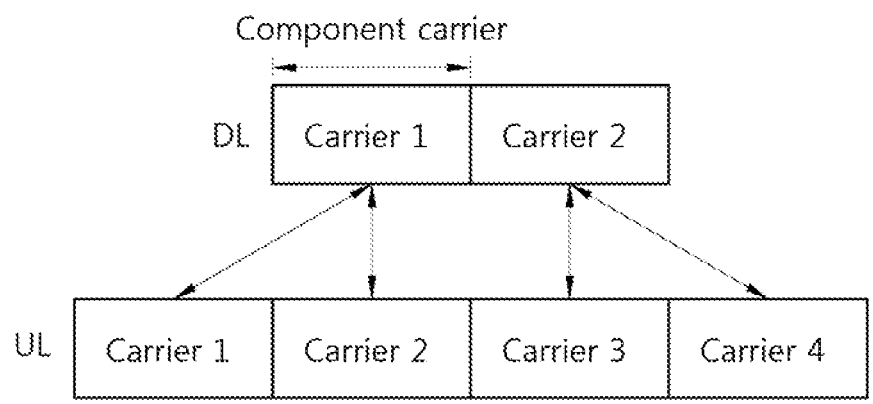
(b) # of UL CC > # of DL CC

METHOD FOR DECODING CONTROL INFORMATION OF TERMINAL IN CARRIER AGGREGATION SYSTEM AND TERMINAL THEREOF

CROSS-REFERENCE TO RELATED APPLICATIONS

This application is the National Stage filing under 35 U.S.C. 371 of International Application No. PCT/KR2011/001520, filed on Mar. 4, 2011, which claims the benefit of earlier filing date and right of priority to Korean Patent Application No. 10-2010-0111256, filed on Nov. 10, 2010, and also claims the benefit of U.S. Provisional Application Ser. No. 61/310,702, filed on Mar. 4, 2010, the contents of which are all hereby incorporated by reference herein in their entirety.

TECHNICAL FIELD

The present invention relates to wireless communications, and more particularly, to a method of decoding control information of a terminal in a carrier aggregation system, and the terminal using the method.

BACKGROUND ART

One of the most important requirements of a next generation wireless communication system is to support a required high data rate. For this, various techniques such as multiple input multiple output (MIMO), cooperative multiple point transmission (CoMP), relay, etc., have been under research, but the most fundamental and reliable solution is to increase a bandwidth.

However, a frequency resource is in a saturation state at present, and various schemes are partially used in a wide frequency band. For this reason, in order to ensure a broadband bandwidth to satisfy a required higher data rate, a system is designed such that a basic requirement which requires separate bands capable of operating respective independent systems is satisfied, and a carrier aggregation (CA) is introduced. In concept, the CA aggregates a plurality of bands into one system. In this case, a band that can be independently managed is defined as a component carrier (CC).

To support growing transmission capacity, the 3GPP LTE-A or the 802.16m has recently expanded its bandwidth to 20 MHz or higher. In this case, a wideband is supported by aggregating one or more CCs. For example, if one CC corresponds to a bandwidth of 5 MHz, four carriers are aggregated to support a bandwidth of up to 20 MHz.

As such, a plurality of CCs are used in the carrier aggregation system. In this case, in a user equipment (UE), a CC for receiving downlink control information from a base station (BS) may be set differently from a CC for receiving downlink data. Alternatively, links of a CC for receiving downlink control information and a CC for transmitting an uplink signal may follow a link relation different from a link determined in the existing LTE. Such a scheduling method is called cross-carrier scheduling.

In case of cross-carrier scheduling, control information (e.g., downlink control information (DCI)) transmitted by the BS may include a field indicating a specific CC for which the DCI is provided. Such a field is called a carrier indication field (CIF), and a value included in the CIF is called a carrier index.

The DCI transmitted by the BS is transmitted using various DCI formats. Some of the DCI formats are used to provide control information for a downlink to the UE, and other DCI formats are used to provide control information for an uplink. However, some DCI formats can be used to provide control information for any one of the uplink and the downlink, and can be used for different purposes in the uplink and the downlink. In this case, there is a need to consider a method used by the UE to interpret the DCI transmitted by the BS and a specific component carrier on which the UE performs communication.

SUMMARY OF INVENTION

Technical Problem

The present invention provides a method of decoding control information of a terminal in a carrier aggregation system, and the terminal using the method.

Technical Solution

According to one aspect of the present invention, a method of decoding control information of a terminal in a carrier aggregation system is provided. The method includes: receiving downlink control information including a carrier indication field from a base station; and decoding the downlink control information, wherein the downlink control information includes at least two or more fields, and a component carrier indicated by a value of the carrier indication field is determined according to a value of a specific field among the at least two or more fields.

In the aforementioned aspect of the present invention, the downlink control information may be interpreted as information regarding an uplink process or information regarding a downlink process according to the value of the specific field.

In addition, the uplink process may be a random access process, and the downlink process may be scheduling for one codeword.

In addition, the downlink control information may include a cyclic redundancy check, and if the cyclic redundancy check is scrambled with an identifier unique to the terminal, and if all fields other than a resource block designating field, preamble index field, and random access channel mask index field included in the downlink control information have a value '0', the downlink control information may be interpreted as information regarding the random access process.

In addition, the identifier unique to the terminal may be a cell-radio network temporary identifier (C-RNTI).

In addition, a value of the carrier indication field may indicate an uplink component carrier or a downlink component carrier according to the value of the specific field.

In addition, the carrier indication field may exist at a predetermined position in the downlink control information, and the carrier indication field may consist of 3 bits.

In addition, the method may further include receiving information regarding a size of the downlink control information from the base station through a higher layer signal.

In addition, the terminal may perform blind decoding on the downlink control information.

According to another aspect of the present invention, there is provided a terminal including: a radio frequency (RF) unit for transmitting and receiving a radio signal; and a processor coupled to the RF unit, wherein the processor is configured for: receiving downlink control information including a carrier indication field from a base station; and decoding the downlink control information, wherein the downlink control information includes at least two or more fields, and a component carrier indicated by a value of the carrier indication field is determined according to a value of a specific field among the at least two or more fields.

Advantageous Effects

According to the present invention, a base station can use a specific downlink control information format with respect to both an uplink and a downlink, and a terminal can know for which component carrier between an uplink component carrier and a downlink component carrier the specific downlink control information format is used by using a specific field value included in the specific downlink control information format. Therefore, the number of blind decoding attempts performed by the terminal can be decreased without having to additionally specify a downlink control information format which differs depending on a usage in a carrier aggregation system. As a result, a decoding speed of downlink control information of the terminal can be improved, and battery consumption can be decreased.

DESCRIPTION OF DRAWINGS

FIG. 9 is an example of a downlink (DL)/uplink (UL) asymmetric carrier aggregation system to which the present invention is applicable.

MODE FOR INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advance (LTE-A) is evolved from the 3GPP LTE.

For clarity, the following description assumes a situation where the present invention applies to an LTE-A system. However, technical features of the present invention are not limited thereto.

Figure 1:
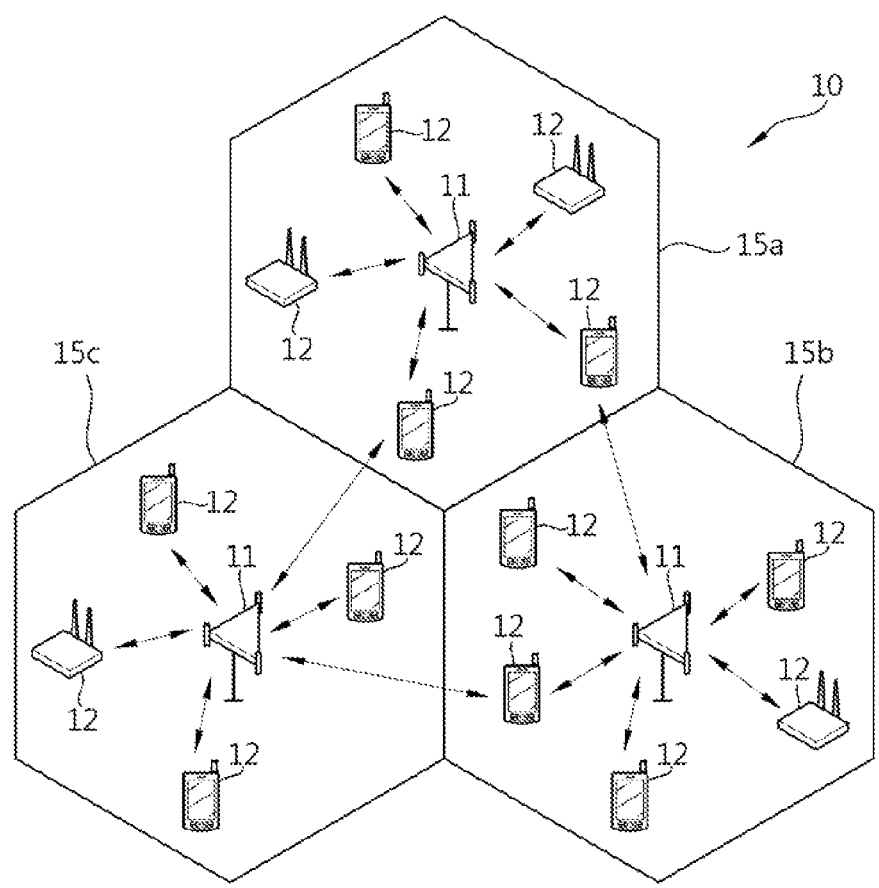
FIG. 1 is an example of a wireless communication system according to an embodiment of the present invention.

FIG. 1 is an example of a wireless communication system according to an embodiment of the present invention.

Referring to FIG. 1, a wireless communication system 10 includes at least one base station (BS) 11. Respective BSs 11 provide communication services to specific geographical regions (generally referred to as cells) 15a, 15b, and 15c. The cell can be divided into a plurality of regions (referred to as sectors). A user equipment (UE) 12 may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc. The BS 11 is generally a fixed station that communicates with the UE 12 and may be referred to as another terminology, such as an evolved node-B (eNB), a base transceiver system (BTS), an access point, etc.

The UE belongs to one cell in general. A cell to which the UE belongs is called a serving cell. A BS which provides a communication service to the serving cell is called a serving BS. Since the wireless communication system is a cellular system, there may be a different cell adjacent to the serving cell. The different cell adjacent to the serving cell is called a neighbor cell. A BS which provides a communication service to the adjacent cell is called a neighbor BS. The serving cell and the neighbor cell are determined relatively with respect to the UE.

In general, a downlink implies communication from the BS 11 to the UE 12, and an uplink implies communication from the UE 12 to the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit (Tx) antennas and a plurality of receive (Rx) antennas. The MISO system uses a plurality of Tx antennas and one Rx antenna. The SISO system uses one Tx antenna and one Rx antenna. The SIMO system uses one Tx antenna and a plurality of Rx antennas.

A Tx antenna implies a physical or logical antenna used to transmit one signal or stream. An Rx antenna implies a physical or logical antenna used to receive one signal or stream.

Figure 2:
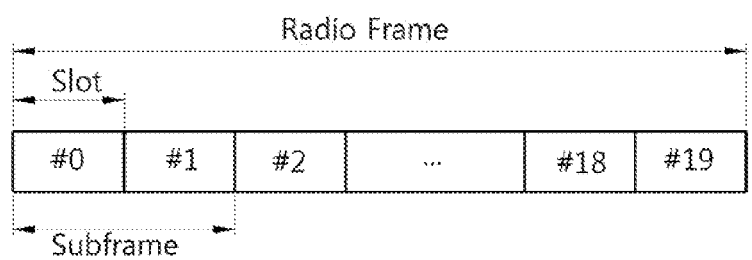
FIG. 2 shows a structure of a radio frame in $3^{rd}$ generation partnership project (3GPP) long term evolution (LTE).

FIG. 2 shows a structure of a radio frame in 3GPP LTE.

The section 5 of 3GPP (3rd Generation Partnership Project) TS 36.211 V8.2.0 (2008-03) "Technical Specification Group Radio Access Network; Evolved Universal Terrestrial Radio Access (E-UTRA); Physical channels and modulation (Release 8)" can be incorporated herein by reference. Referring to FIG. 2, the radio frame consists of 10 subframes. One subframe consists of two slots. Slots included in the radio frame are numbered with slot numbers #0 to #19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

One slot includes a plurality of orthogonal frequency division multiplexing (OFDM) symbols in a time domain, and includes a plurality of subcarriers in a frequency domain. The OFDM symbol is for representing one symbol period. Such a name is derived from that 3GPP LTE uses OFDMA in a downlink. The OFDM symbol can be referred to as another term. For example, when single carrier-frequency division multiple access (SC-FDMA) is used as an uplink multiple-access scheme, the OFDM symbol can also be referred to as an SC-FDMA symbol.

In 3GPP LTE, it is defined such that one slot includes 7 OFDM symbols in a normal cyclic prefix (CP) and one slot includes 6 OFDM symbols in an extended CP.

The above radio frame structure is shown for exemplary purposes only. Thus, the number of subframes included in the radio frame or the number of slots included in the subframe or the number of OFDM symbols included in the slot may change variously.

Figure 3:
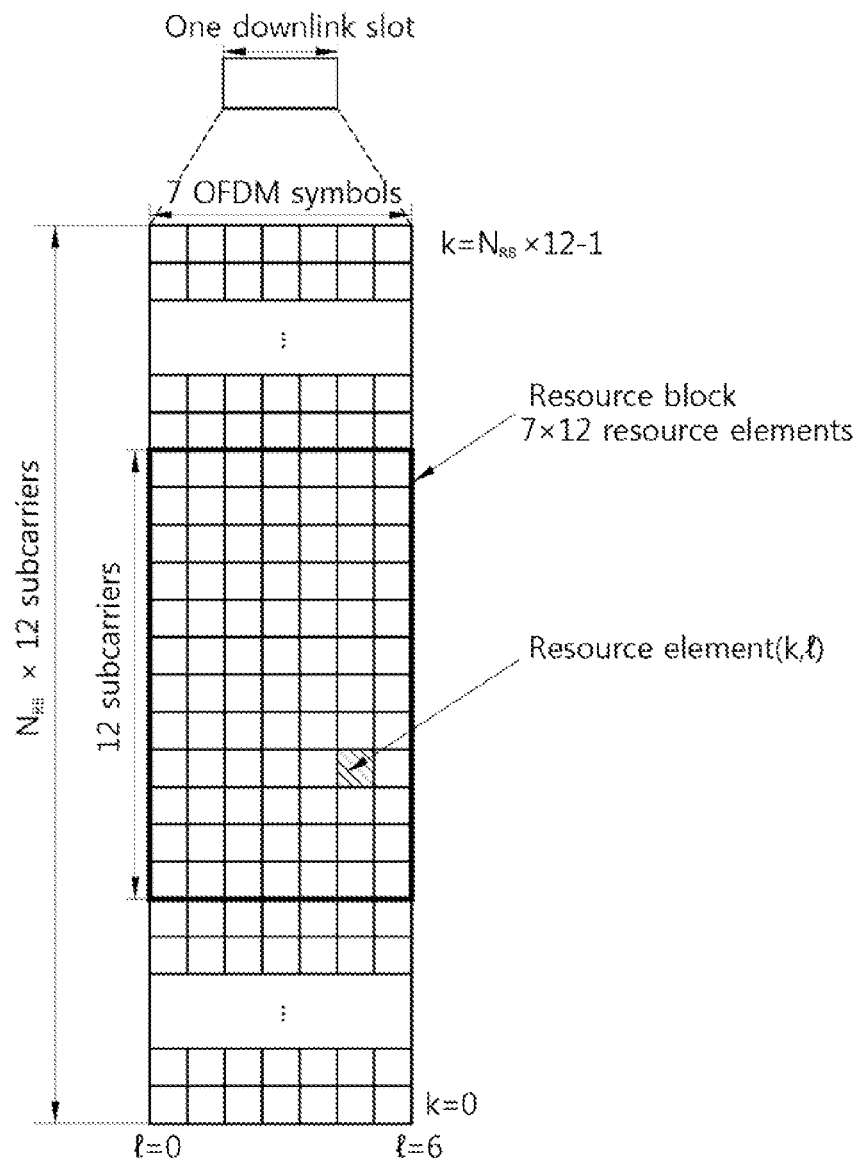
FIG. 3 shows an example of a resource grid for one downlink slot.

FIG. 3 shows an example of a resource grid for one downlink slot.

The downlink slot includes a plurality of OFDM symbols in a time domain and a plurality of $N_{RB}$ resource blocks (RBs) in a frequency domain. The RB is a resource allocation unit, and includes one slot in the time domain and a plurality of contiguous subcarriers in the frequency domain.

The number $N_{RB}$ of RBs included in the downlink slot depends on a downlink transmission bandwidth determined in a cell. For example, in an LTE system, $N_{RB}$ may be any one value in the range of 60 to 110. An uplink slot may have the same structure as the downlink slot.

Each element on the resource grid is referred to as a resource element (RE). The RE on the resource grid can be identified by an index pair (k, l) within the slot. Herein, k (k=0, . . . , $N_{RB} \times 12-1$) denotes a subcarrier index in the frequency domain, and l (l=0, . . . , 6) denotes an OFDM symbol index in the time domain.

Although it is described herein that one RB includes 7×12 REs consisting of 7 OFDM symbols in the time domain and 12 subcarriers in the frequency domain for example, the number of OFDM symbols and the number of subcarriers in the RB are not limited thereto. Thus, the number of OFDM symbols and the number of subcarriers may change variously depending on a CP length, a frequency spacing, etc. For example, when using a normal CP, the number of OFDM symbols is 7, and when using an extended CP, the number of OFDM symbols is 6. In one OFDM symbol, the number of subcarriers may be selected from 128, 256, 512, 1024, 1536, and 2048.

Figure 4:
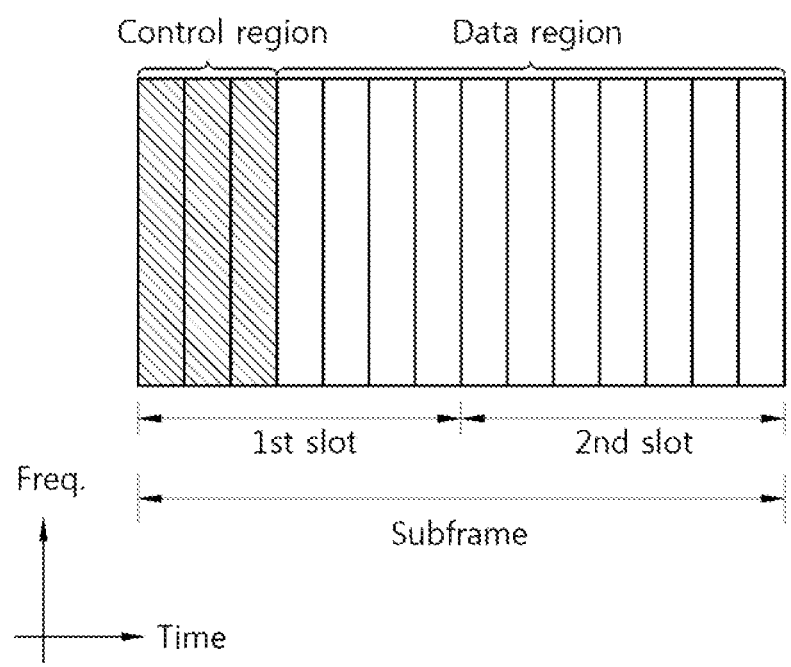
FIG. 4 shows a structure of a downlink subframe.

FIG. 4 shows a structure of a downlink subframe.

The downlink subframe includes two slots in a time domain, and each slot includes 7 OFDM symbols in a normal CP. Up to three OFDM symbols (i.e., in case of 1.4 MHz bandwidth, up to 4 OFDM symbols) located in a front portion of a first slot within the subframe correspond to a control region, and the remaining OFDM symbols correspond to a data region. Herein, control channels are allocated to the control region, and a physical downlink shared channel (PDSCH) is allocated to the data region. The PDSCH implies a channel in which a BS transmits data to a UE.

A physical downlink control channel (PDCCH) can carry a downlink shared channel (DL-SCH)'s resource allocation (referred to as a downlink (DL) grant) and transmission format, uplink shared channel (UL-SCH)'s resource allocation information (referred to as an uplink (UL) grant), paging information on a PCH, system information on a DL-SCH, a resource allocation of a higher layer control message such as a random access response transmitted through a PDSCH, a transmission power control command for individual UEs included in any UE group, activation of a voice over Internet (VoIP), etc. Control information transmitted through the PDCCH is referred to as downlink control information (DCI).

The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). An REG includes a plurality of resource elements (REs). A format of the PDCCH and the number of bits of the available PDCCH are determined according to a correlation between the number of CCEs and the coding rate provided by the CCEs.

The BS determines a format according to a DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for a system information block (SIB), a system information identifier and a system information RNTI (SI-RNTI) may be masked to the CRC. To indicate a random access response which is a response for transmission of a random access preamble of the UE, a random access-RNTI (RA-RNTI) may be masked to the CRC.

The UE receives the DCI on the PDCCH by using blind decoding. A plurality of PDCCH candidates can be transmitted in the control region of one subframe. The UE monitors the plurality of PDCCH candidates in every subframe. Herein, monitoring is an operation in which the UE attempts decoding of each PDCCH according to a to-be-monitored PDCCH format. The UE monitors a set of PDCCH candidates in a subframe to find its own PDCCH. For example, if there is no cyclic redundancy check (CRC) error detected by performing de-making on an identifier (i.e., cell-radio network temporary identifier (RNTI)) of the UE in a corresponding PDCCH, the UE detects this PDCCH as a PDCCH having a DCI of the UE.

In the aforementioned process, the UE cannot know about a specific position in a control region in which its PDCCH is transmitted and about a specific CCE aggregation or DCI format used for PDCCH transmission. The 3GPP LTE uses a search space (SS) to reduce an overload caused by blind decoding. The SS can be called a monitoring set of CCEs for the PDCCH. The UE monitors the PDCCH within the SS. The SS is classified into a common SS and a UE-specific SS. The common SS is a space for searching for a PDCCH having common control information and consists of 16 CCEs indexed with 0 to 15. The common SS supports a PDCCH having a CCE aggregation level of {4, 8}. However, a PDCCH (e.g., DCI formats 0, 1A) for carrying UE-specific information can also be transmitted in the common SS. The UE-specific SS supports a PDCCH having a CCE aggregation level of {1, 2, 4, 8}.

Table 1 below shows an example of the number of blind decoding attempts of the UE.

TABLE 1

| Search Space Type | Aggregation level L | Size [In CCEs] | Number of PDCCH candidates | DCI formats | # of blind decodings |
|---|---|---|---|---|---|
| UE-specific | 1 | 6 | 6 | 0, 1, 1A, 1B, 1D, 2, 2A | (6 + 6 + 2 + 2) * 2 = 32 |
|  | 2 | 12 | 6 |  |  |
|  | 4 | 8 | 2 |  |  |
|  | 8 | 16 | 2 |  |  |
| Common | 4 | 16 | 4 | 0, 1A, 1C, 3/3A | (4 + 2) * 2 = 12 |
|  | 8 | 16 | 2 |  |  |

As shown in Table 1, the UE may have to perform up to 44 blind decoding attempts.

A downlink transmission mode between a BS and a UE can be classified into 7 modes as follows.

1. A single antenna port: Precoding is not performed in this mode
2. Transmit diversity: Transmit diversity can be used in 2 or 4 antenna ports using SFBC.
3. Open-loop spatial multiplexing: This is an open-loop mode in which rank adaptation based on RI feedback is possible. The transmit diversity is applicable when a rank is 1. A great delay CDD can be used when the rank is greater than 1.
4. Closed-loop spatial multiplexing: This is a mode in which precoding feedback supporting dynamic rank adaptation is applied.
5. Multi-user MIMO
6. Closed-loop rank-1 precoding
7. Single-antenna port: This is a mode that can be used for beamforming when a UE-specific reference signal is used.

Table 2 below shows an example of a DCI format to be monitored by a UE according to the aforementioned downlink transmission mode.

TABLE 2

| Transmission mode | DCI format to be monitored |
|---|---|
| 1. Single-antenna port; port 0 | DCI 0/1A, DCI 1 |
| 2. Transmit diversity | DCI 0/1A, DCI 1 |
| 3. Open-loop spatial multiplexing | DCI 0/1A, DCI 2A |
| 4. Close-loop spatial multiplexing | DCI 0/1A, DCI 2 |
| 5. Multi-user MIMO | DCI 0/1A, DCI 1D |
| 6. closed-loop rank = 1 precoding | DCI 0/1A, DCI 1B |
| 7. Single-antenna port; port 5 | DCI 0/1A, DCI 1 |

The conventional DCI formats transmitted through the PDCCH will be described.

A DCI format includes fields described below, and the respective fields can be mapped to information bits $a_0$ to $a_{A-1}$. The respective fields can be mapped in the same order as described in the respective DCI formats. The respective fields may have zero-padding bits. A first field can be mapped to an information bit $a_0$ having a lowest order, and consecutive other fields can be mapped to information bits having higher orders. In each field, a most significant bit (MSB) can be mapped to an information bit having a lowest order of a corresponding field. For example, an MSB of the first field can be mapped to $a_0$.

1. DCI format 0

A DCI format 0 is used for PUSCH scheduling. Examples of information (field) transmitted by using the DCI format 0 are as follows.

1) a flag for identifying the DCI format 0 and a DCI format 1A (if the flag is 0, it indicates the DCI format 0, and if the flag is 1, it indicates the DCI format 1A), 2) a hopping flag (1 bit), 3) a resource block designation and a hopping resource allocation, 4) a modulation and coding scheme and a redundancy version (5 bits), 5) a new data indicator (1 bit), 6) a TPC command (2 bits) for a scheduled PUSCH, 7) a cyclic shift (3 bits) for DM-RS, 8) an uplink (UL) index, 9) a downlink (DL) designation index (only in a TDD), 10) CQI request, etc. If the number of information bits in the DCI format 0 is less than a payload size of the DCI format 1A, '0' is padded so that it is equal to the payload size of the DCI format 1A.

2. DCI format 1

A DCI format 1 is used for one PDSCH codeword scheduling. Examples of information transmitted in the DCI format 1 are as follows.

1) a resource allocation header (indicating a resource allocation type 0/type 1)—if a DL bandwidth is less than 10 PRBs, the resource allocation header is not included and the resource allocation type 0 is assumed. 2) a resource block designation, 3) a modulation and coding scheme, 4) an HARQ process number, 5) a new data indicator, 6) a redundancy version, 7) a TPC command for a PUCCH, 8) a DL designation index (only in a TDD), etc. If the number of information bits of the DCI format 1 is equal to that of the DCI format 0/1A, one bit having a value of '0' is added to the DCI format 1. If the number of information bits in the DCI format 1 is equal to any one of {12, 14, 16, 20, 24, 26, 32, 40, 44, 56}, a bit having one or more values of '0' is added to the DCI format 1 so that it is different from {12, 14, 16, 20, 24, 26, 32, 40, 44, 56} and has a payload size different from that of the DCI format 0/1A.

3. DCI format 1A

A DCI format 1A is used for compact scheduling of one PDSCH codeword or a random access process.

Examples of information transmitted in the DCI format 1A are as follows. 1) a flag for identifying the DCI format 0 and the DCI format 1A, 2) a localized/distributed VRB designation flag, 3) a resource block designation, 4) a modulation and coding scheme, 5) an HARQ process number, 6) a new data indicator, 7) a redundancy version, 8) a TPC command for a PUCCH, 9) a DL designation index (only in a TDD), etc. If the number of information bits of the DCI format 1A is less than the number of information bits of the DCI format 0, bits having a value of '0' are added so that it has the same size as the payload size of the DCI format 0. If the number of information bits in the DCI format 1A is equal to any one of {12, 14, 16, 20, 24, 26, 32, 40, 44, 56}, a bit having one value of '0' is added to the DCI format 1A.

4. DCI format 1B

A DCI format 1B includes precoding information and is used for compact scheduling for one PDSCH codeword. Examples of information transmitted in the DCI format 1B are as follows.

1) a localized/distributed VRB designation flag, 2) a resource block designation, 3) a modulation and coding scheme, 4) an HARQ process number, 5) a new data indicator, 6) a redundancy version, 7) a TPC command for a PUCCH, 8) a DL designation index (only in a TDD), 9) transmitted precoding matrix indicator (TPMI) information for precoding, 10) a PMI confirmation for precoding, etc. If the number of information bits in the DCI format 1B is equal to any one of {12, 14, 16, 20, 24, 26, 32, 40, 44, 56}, a bit having one value of '0' is added to the DCI format 1B.

5. DCI format 1C

A DCI format 1C is used for very compact scheduling for one PDSCH codeword. Examples of information transmitted in the DCI format 1C are as follows.

1) an indicator indicating a gap value, 2) a resource block designation, 3) a transport block size index, etc.

6. DCI format 1D

A DCI format 1D includes precoding and power offset information and is used for compact scheduling for one PDSCH codeword.

Examples of information transmitted in the DCI format 1D are as follows.

1) a localized/distributed VRB designation flag, 2) a resource block designation, 3) a modulation and coding scheme, 4) an HARQ process number, 5) a new data indicator, 6) a redundancy version, 7) a TPC command for a PUCCH, 8) a DL designation index (only in a TDD), 9) TPMI information for precoding, 10) a DL power offset, etc. If the number of information bits in the DCI format 1D is equal to any one of {12, 14, 16, 20, 24, 26, 32, 40, 44, 56}, a bit having one value of '0' is added to the DCI format 1D.

7. DCI format 2

A DCI format 2 is used to designate a PDSCH for a close-loop MIMO operation. Examples of information transmitted in the DCI format 2 are as follows.

1) a resource allocation header, 2) a resource block designation, 3) a TPC command for a PUCCH, 4) a DL designation index (only in a TDD), 5) an HARQ process number, 6) a transport block to codeword swap flag, 7) a modulation and coding scheme, 8) a new data indicator, 9) a redundancy version, 10) precoding information, etc.

8. DCI format 2A

A DCI format 2A is used to designate a PDSCH for an open-loop MIMO operation. Examples of information transmitted in the DCI format 2A are as follows.

1) a resource allocation header, 2) a TPC command for a PUCCH, 3) a DL designation index (only in a TDD), 4) an HARQ process number, 5) a transport block to codeword swap flag, 6) a modulation and coding scheme, 7) a new data indicator, 8) a redundancy version, 9) precoding information, etc.

9. DCI format 3

A DCI format 3 is used to transmit a TPC command for a PUCCH and a PUSCH through 2-bit power regulation. Examples of information transmitted in the DCI format 3 are as follows.

1) N transmit power control (TPC) commands. Herein, N is determined by Equation 1 below.

$$N = \left\lfloor \frac{L_{format\,0}}{2} \right\rfloor \quad \text{[Equation 1]}$$

Herein, $L_{format0}$ is equal to a payload size of a DCI format 0 before CRC is attached. If floor ($L_{format0}/2$) is less than $L_{format0}/2$, one bit having a value of '0' is added.

10. DCI format 3A

A DCI format 3A is used to transmit a TPC command for a PUCCH and a PUSCH through 1-bit power regulation. Examples of information transmitted in the DCI format 3A are as follows.

1) M TPC commands. Herein, $M=L_{format0}$, $L_{format0}$ is equal to a payload size of a DCI format 0 before CRC is attached.

The section 5.3.3.1 of 3GPP TS 36.212 V8.7.0 (2009-05) can be incorporated herein to describe the DCI formats.

Figure 5:
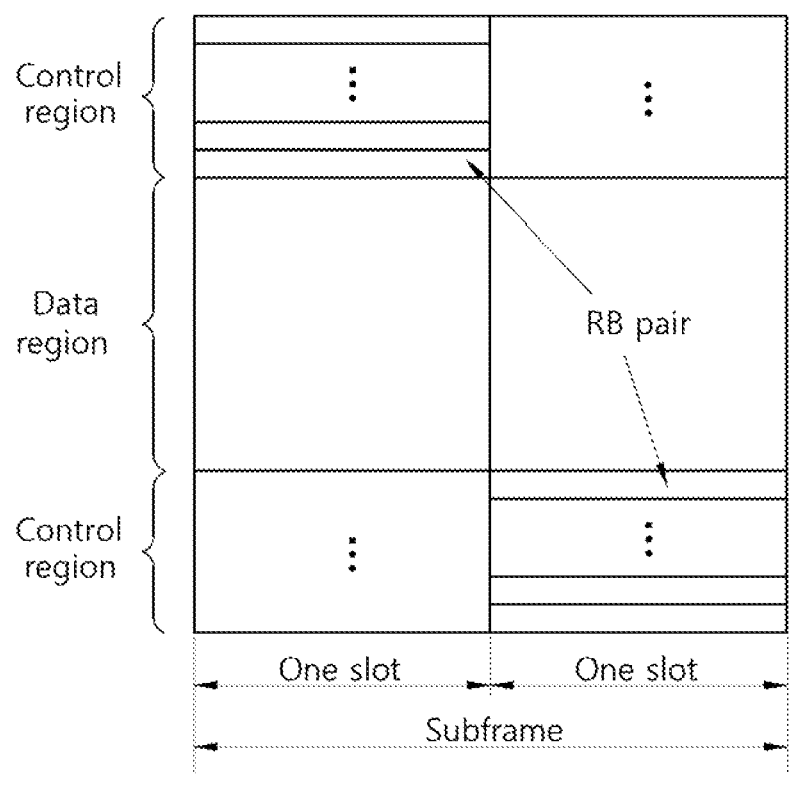
FIG. 5 shows a structure of an uplink subframe.

FIG. 5 shows a structure of a UL subframe.

The UL subframe can be divided into a control region and a data region in a frequency domain. A physical uplink control channel (PUCCH) for transmitting UL control information is allocated to the control region. A physical uplink shared channel (PUSCH) for transmitting data is allocated to the data region. To maintain a single-carrier property, a UE does not simultaneously transmit the PUCCH and the PUSCH.

The PUCCH for one UE is allocated in an RB pair in a subframe. RBs belonging to the RB pair occupy different subcarriers in each of a $1^{st}$ slot and a $2^{nd}$ slot. A frequency occupied by the RBs belonging to the RB pair allocated to the PUCCH changes at a slot boundary. This is called that the RB pair allocated to the PUCCH is frequency-hopped in a slot boundary. Since the UE transmits UL control information over time through different subcarriers, a frequency diversity gain can be obtained.

Examples of UL control information transmitted on the PUCCH include hybrid automatic repeat request (HARQ) acknowledgement (ACK)/non-acknowledgment (NACK), a channel quality indicator (CQI) indicating a DL channel state, a scheduling request (SR) as a request for UL radio resource allocation, etc.

The PUSCH is mapped to an uplink shared channel (UL-SCH) which is a transport channel. UL data transmitted through the PUSCH may be a transport block which is a data block for the UL-SCH transmitted during a TTI. The transport block may be user information. Alternatively, the UL data may be multiplexed data. The multiplexed data may be obtained by multiplexing a transport block for the UL-SCH and control information. Examples of the control information multiplexed to the data may include a CQI, a precoding matrix indicator (PMI), HARQ, a rank indicator (RI), etc. Alternatively, the UL data may consist of only control information.

In the LTE-A system, an SC-FDMA transmission scheme is applied in a UL. SC-FDMA is a transmission scheme in which IFFT is performed after DFT spreading is performed. The SC-FDMA is also called DFT-spread OFDM (DFT-s OFDM). A peak-to-average power ratio (PAPR) or a cubic metric (CM) can decrease in the SC-FDMA. When using the SC-FDMA transmission scheme, a non-linear distortion duration of a power amplifier can be avoided and thus transmit power efficiency can increase in a UE in which power consumption is limited. Accordingly, a user throughput can increase.

Meanwhile, a 3GPP LTE-A system supports a carrier aggregation system. 3GPP TR 36.815 V9.0.0 (2010-3) may be incorporated herein by reference to describe the carrier aggregation system.

The carrier aggregation system implies a system that configures a wideband by aggregating one or more carriers having a bandwidth smaller than that of a target wideband when the wireless communication system intends to support the wideband. The carrier aggregation system can also be referred to as other terms such as a multiple carrier system, a bandwidth aggregation system, or the like. The carrier aggregation system can be divided into a contiguous carrier aggregation system in which carriers are contiguous to each other and a non-contiguous carrier aggregation system in which carriers are separated from each other. Hereinafter, when it is simply called the carrier aggregation system, it should be interpreted such that both cases of contiguous component carriers (CCs) and non-contiguous CCs are included.

In the contiguous carrier aggregation system, a guard band may exist between carriers. A carrier which is a target when aggregating one or more carriers can directly use a bandwidth that is used in the legacy system in order to provide backward compatibility with the legacy system. For example, a 3GPP LTE system can support a bandwidth of 1.4 MHz, 3 MHz, 5 MHz, 10 MHz, 15 MHz, and 20 MHz, and a 3GPP LTE-A system can configure a wideband of 20 MHz or higher by using only the bandwidth of the 3GPP LTE system. Alternatively, the wideband can be configured by defining a new bandwidth without having to directly use the bandwidth of the legacy system.

In the carrier aggregation system, a UE can transmit or receive one or a plurality of carriers simultaneously according to capacity. A UE based on the LTE-A standard (i.e., an LTE-A UE) can transmit or receive a plurality of carriers simultaneously. A UE based on the LTE Rel-8 standard (i.e., an LTE Rel-8 UE) can transmit or receive only one carrier when each of carriers constituting the carrier aggregation system is compatible with an LTE Rel-8 system. Therefore, when the number of carriers used in a UL is equal to the number of carriers used in a DL, it is necessary to configure such that all CCs are compatible with the LTE Rel-8 system.

In order to efficiently use a plurality of carriers, the plurality of carriers can be managed by media access control (MAC).

Figure 6:
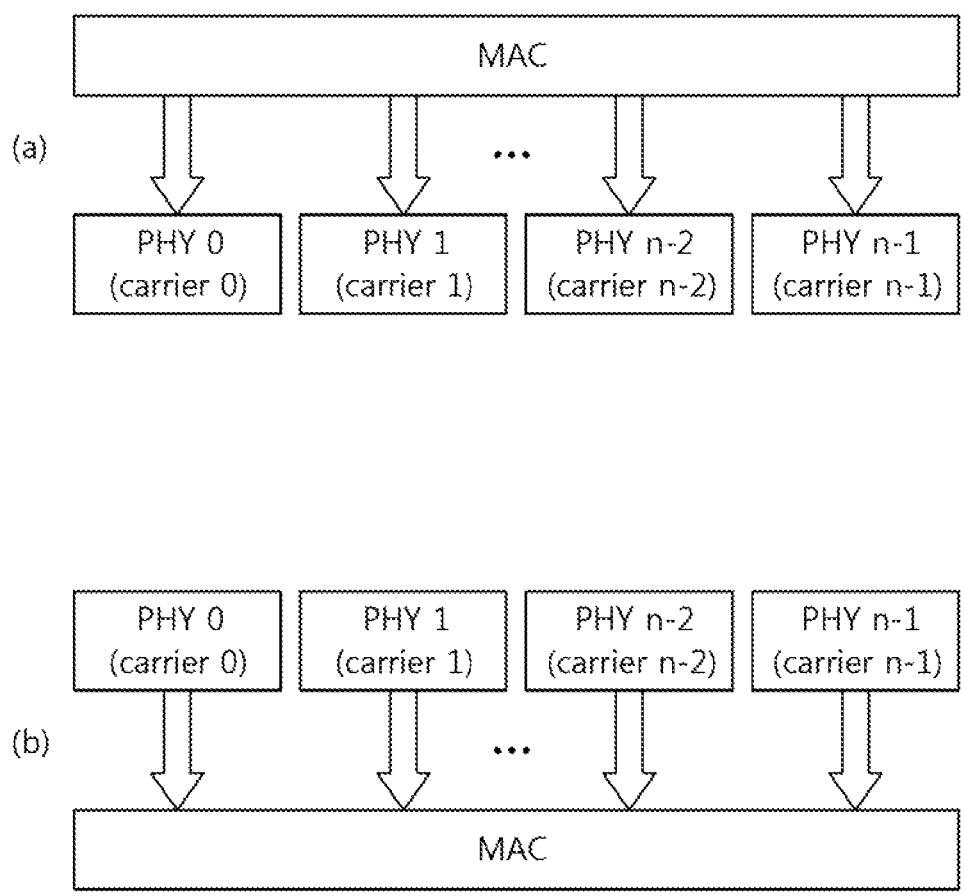
FIG. 6 shows an example of a base station (BS) and a user equipment (UE) which constitute a carrier aggregation system.

FIG. 6 shows an example of a BS and a UE which constitute a carrier aggregation system.

In the BS of FIG. 6(a), one MAC transmits and receives data by managing and operating all of n carriers. This is also applied to the UE of FIG. 6(b). From the perspective of the UE, one transport block and one HARQ entity may exist per CC. The UE can be scheduled simultaneously for a plurality of carriers. The carrier aggregation system of FIG. 6 can apply both to a contiguous carrier aggregation system and a non-contiguous carrier aggregation system. The respective carriers managed by one MAC do not have to be contiguous to each other, which results in flexibility in terms of resource management.

Figure 7:
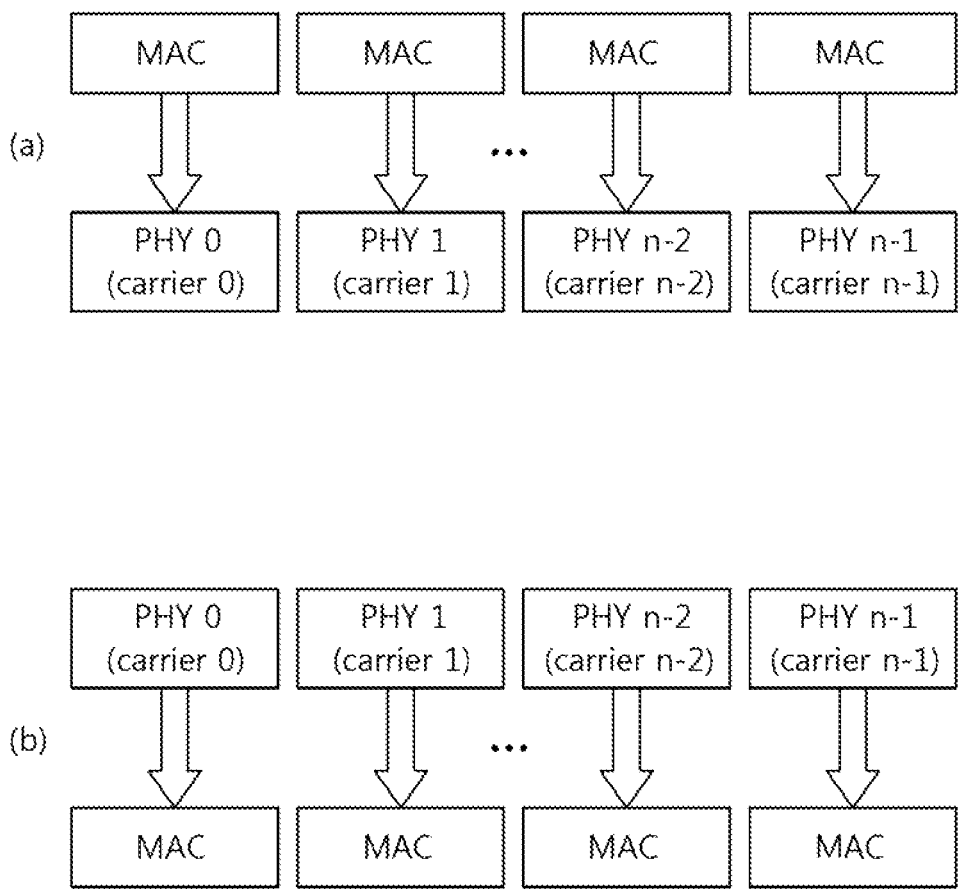
FIG. 7 and FIG. 8 show other examples of a BS and a UE which constitute a carrier aggregation system.
Figure 8:
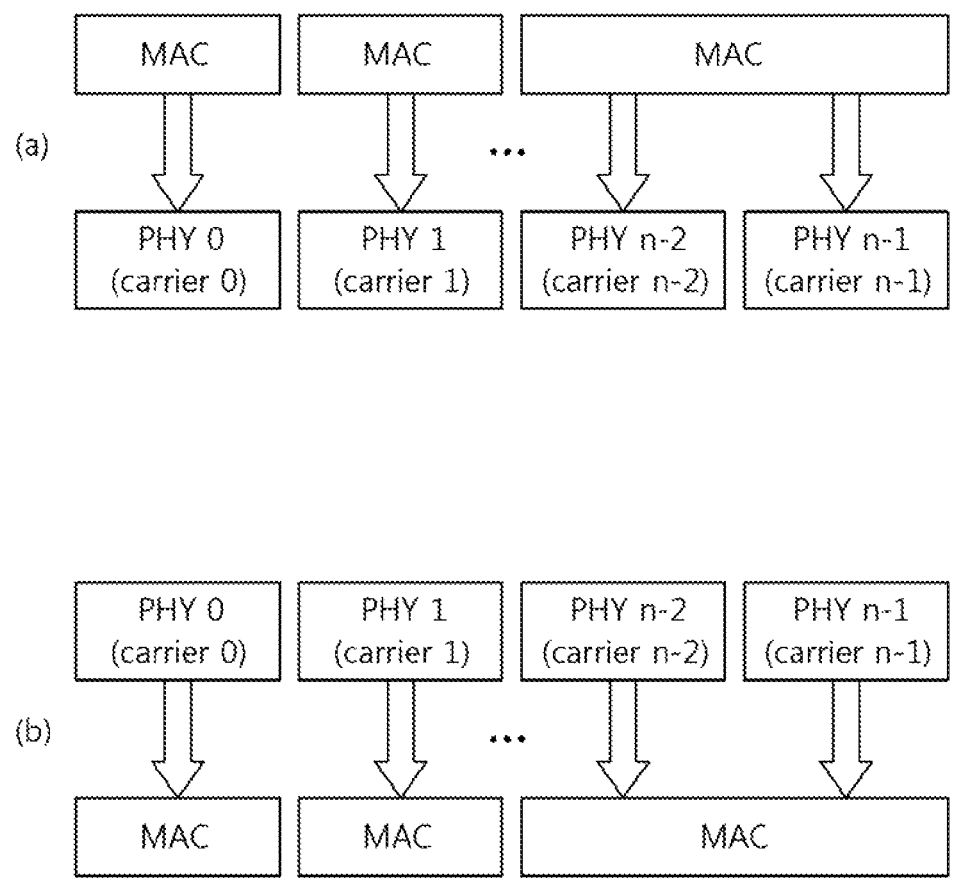

FIG. 7 and FIG. 8 show other examples of a BS and a UE which constitute a carrier aggregation system.

In the BS of FIG. 7(a) and the UE of FIG. 7(b), one MAC manages only one carrier. That is, the MAC and the carrier are 1:1 mapped. In the BS of FIG. 8(a) and the UE of FIG. 8(b), a MAC and a carrier are 1:1 mapped for some carriers, and regarding the remaining carriers, one MAC controls a plurality of carriers. That is, various combinations are possible based on a mapping relation between the MAC and the carrier.

The carrier aggregation system of FIG. 6 to FIG. 8 includes n carriers. The respective carriers may be contiguous to each other or may be separated from each other. The carrier aggregation system can apply both to a UL and a DL. In a TDD system, each carrier is configured to be able to perform UL transmission and DL transmission. In an FDD system, a plurality of carriers can be used by dividing them for a UL usage and a DL usage. In a typical TDD system, the number of CCs used in the UL is equal to that used in the DL, and each carrier has the same bandwidth. The FDD system can configure an asymmetric carrier aggregation system by allowing the number of carriers and the bandwidth to be different between the UL and the DL.

FIG. 9 is an example of a DL/UL asymmetric carrier aggregation system to which the present invention is applicable.

FIG. 9(a) shows a case where the number of DL CCs is greater than the number of UL CCs, and FIG. 9(b) shows a case where the number of UL CCs is greater than the number of DL CCs. Although FIG. 9(a) shows a case where two DL CCs are linked to one UL CC and FIG. 9(b) shows a case where one DL CC is linked to two UL CCs, the number of CCs constituting a DL and a UL and a linkage ratio of the DL CC and the UL CC can change variously according to a carrier aggregation system to which the present invention is applied, and the content proposed in the present invention can also apply to a symmetric carrier aggregation system in which a CC constituting the DL and a CC constituting the UL are 1:1 linked.

A carrier having backward compatibility in the LTE-A system is accessible by the conventional UE by considering compatibility with UEs of the conventional 3GPP LTE system, and can function as independent one carrier or as a part of carrier aggregation. The carrier having backward compatibility is always configured in a pair form of the DL and the UL in an FDD system. For this, a carrier not having backward compatibility is not accessible to the conventional UE since the carrier is newly defined without considering compatibility with UEs operating in the conventional LTE system. An extension carrier cannot function as independent one carrier. The extension carrier is a carrier which functions as a part of a component carrier set including a carrier that can function as independent one carrier.

In a carrier aggregation system, a cell-specific or/and UE-specific method can be taken into account as a form of using one or a plurality of carriers. In the following description of the present invention, the cell-specific method implies a carrier configuration from the perspective of any cell or BS and the UE-specific method implies a carrier configuration from the perspective of a UE.

The cell-specific carrier aggregation may have a form of carrier aggregation configured by any BS or cell. In case of an FDD system, a form of the cell-specific carrier aggregation may be a form in which a DL and UL linkage is determined according to a Tx-Rx separation specified in 3GPP LTE release-8/LTE-A. For example, a carrier frequency in the UL and the DL can be designated by an E-UTRA absolute radio frequency channel number (EARFCN) in the range 0 to 65535. The EARFCN and a carrier frequency in MHz unit for the DL may have a relation given by Equation 2 below.

$$F_{DL} = F_{DL\_low} + 0.1(N_{DL} - N_{Offs\text{-}DL})$$ [Equation 2]

In Equation 2 above, $N_{DL}$ is a DL EARFCN, and $F_{DL\_low}$ and $N_{Offs\text{-}DL}$ are given by Table 3 below.

TABLE 3

| E-UTRA Operating Band | Downlink | | | Uplink | | |
|---|---|---|---|---|---|---|
| | $F_{DL\_low}$ (MHz) | $N_{Offs\text{-}DL}$ | Range of $N_{DL}$ | $F_{UL\_low}$ (MHz) | $N_{Offs\text{-}UL}$ | Range of $N_{UL}$ |
| 1 | 2110 | 0 | 0-599 | 1920 | 18000 | 18000-18599 |
| 2 | 1930 | 600 | 600-1199 | 1850 | 18600 | 18600-19199 |
| 3 | 1805 | 1200 | 1200-1949 | 1710 | 19200 | 19200-19949 |
| 4 | 2110 | 1950 | 1950-2399 | 1710 | 19950 | 19950-20399 |
| 5 | 869 | 2400 | 2400-2649 | 824 | 20400 | 20400-20649 |
| 6 | 875 | 2650 | 2650-2749 | 830 | 20650 | 20650-20749 |
| 7 | 2620 | 2750 | 2750-3449 | 2500 | 20750 | 20750-21449 |
| 8 | 925 | 3450 | 3450-3799 | 880 | 21450 | 21450-21799 |

TABLE 3-continued

| E-UTRA Operating Band | Downlink | | | Uplink | | |
|---|---|---|---|---|---|---|
| | $F_{DL\_low}$ (MHz) | $N_{Offs-DL}$ | Range of $N_{DL}$ | $F_{UL\_low}$ (MHz) | $N_{Offs-UL}$ | Range of $N_{UL}$ |
| 9 | 1844.9 | 3800 | 3800-4149 | 1749.9 | 21800 | 21800-22149 |
| 10 | 2110 | 4150 | 4150-4749 | 1710 | 22150 | 22150-22749 |
| 11 | 1475.9 | 4750 | 4750-4999 | 1427.9 | 22750 | 22750-22999 |
| 12 | 728 | 5000 | 5000-5179 | 698 | 23000 | 23000-23179 |
| 13 | 746 | 5180 | 5180-5279 | 777 | 23180 | 23180-23279 |
| 14 | 758 | 5280 | 5280-5379 | 788 | 23280 | 23280-23379 |
| ... | | | | | | |
| 17 | 734 | 5730 | 5730-5849 | 704 | 23730 | 23730-23849 |
| ... | | | | | | |
| 33 | 1900 | 26000 | 36000-36199 | 1900 | 36000 | 36000-36199 |
| 34 | 2010 | 26200 | 36200-36349 | 2010 | 36200 | 36200-36349 |
| 35 | 1850 | 26350 | 36350-36949 | 1850 | 36350 | 36350-36949 |
| 36 | 1930 | 26950 | 36950-37549 | 1930 | 36950 | 36950-37549 |
| 37 | 1910 | 27550 | 37550-37749 | 1910 | 37550 | 37550-37749 |
| 38 | 2570 | 27750 | 37750-38249 | 2570 | 37750 | 37750-38249 |
| 39 | 1880 | 28250 | 38250-38649 | 1880 | 38250 | 38250-38649 |
| 40 | 2300 | 28650 | 38650-39649 | 2300 | 38650 | 38650-39649 |

NOTE:
The channel numbers that designate carrier frequencies so close to the operating band edges that the carrier extends beyond the operating band edge shall not be used. This implies that the first 7, 15, 25, 50, 75 and 100 channel numbers at the lower operating band edge and the last 6, 14, 24, 49, 74 and 99 channel numbers at the upper operating band edge shall not be used for channel bandwidths of 1.4, 3, 5, 10, 15 and 20 MHz respectively.

An E-UTRA transmission channel (carrier centre frequency) to reception channel (carrier centre frequency) separation based on transmission and reception channel bandwidths can be defined by Table 4 below.

TABLE 4

| Frequency Band | TX - RX carrier centre frequency separation |
|---|---|
| 1 | 190 MHz |
| 2 | 80 MHz. |
| 3 | 95 MHz. |
| 4 | 400 MHz |
| 5 | 45 MHz |
| 6 | 45 MHz |
| 7 | 120 MHz |
| 8 | 45 MHz |
| 9 | 95 MHz |
| 10 | 400 MHz |
| 11 | 48 MHz |
| 12 | 30 MHz |
| 13 | −31 MHz |
| 14 | −30 MHz |
| 17 | 30 MHz |

For details related to the above description, the section 5.7 of 3GPP TS 36.101 V8.4.0 released in December, 2008 can be incorporated by reference.

Now, a UE-specific carrier aggregation that can be used in a carrier aggregation system will be described. The UE-specific carrier aggregation is an operation of configuring a component carrier (CC) set that can be used by a specific UE or a specific UE group by using any method, for example, UE capability, signaling, etc., between a BS and a UE.

A UE-specific DL CC set can be defined as a set of DL CCs scheduled to receive a DL data channel (i.e., PDSCH) configured through dedicated signaling with respect to a specific UE. A UE-specific UL CC set can be defined as a set of UL CCs scheduled to transmit a UL data channel (i.e., PUSCH).

In the carrier aggregation system, a PDCCH monitoring CC set implies a set of CCs for monitoring a PDCCH, that is, a control channel for transmitting control information by a specific UE. The monitoring CC set may be a DL CC included in a UE-specific DL CC set, or may be a DL CC which includes a part of the UE-specific DL CC or which is not included in the UE-specific DL CC set. The PDCCH monitoring DL CC set can be configured in a UE-specific or cell-specific manner.

Cross-carrier scheduling is a scheduling method capable of performing resource allocation of a PDSCH transmitted by using a different carrier through a PDCCH transmitted through a specific CC and/or resource allocation of a PUSCH transmitted through another CC other than a CC basically linked to the specific CC. That is, the PDCCH and the PDSCH can be transmitted through different DL CCs, and the PUSCH can be transmitted through a UL CC other than a UL CC linked to a DL CC on which a PDCCH including a UL grant is transmitted. As such, in a system supporting the cross-carrier scheduling, a carrier indicator is required to report a specific DL CC/UL CC used to transmit the PDSCH/PUSCH for which the PDCCH provides control information. A field including the carrier indicator is hereinafter called a carrier indication field (CIF).

A system supporting cross-carrier scheduling may include the CIF in the existing DCI format. In a system supporting the cross-carrier scheduling, e.g., in an LTE-A system, the CIF can be added to the existing format (i.e., a DCI format used in LTE) and thus one to three bits can be extended, and a PDCCH structure can reuse the existing coding scheme, resource allocation scheme (i.e., CCE-based resource mapping), etc.

The system supporting cross-carrier scheduling can also support non cross-carrier scheduling. The non cross-carrier scheduling is a scheduling scheme in which resource allocation of a PDSCH of the same CC is performed through a PDCCH transmitted through a specific CC, and resource allocation of a PUSCH transmitted through one CC linked to the specific CC is performed. The CIF may not be included in case of the non cross-carrier scheduling. In this case, the conventional PDCCH structure and DCI format can be reused.

A BS can semi-statically configure whether the cross-carrier scheduling is activated. That is, the BS can semi-statically configure whether the CIF is included in the DCI format, and can configure it in a UE (or UE group) specific or cell specific manner. According to the semi-static configuration, a signaling overhead between the BS and the UE can be decreased.

Figure 10:
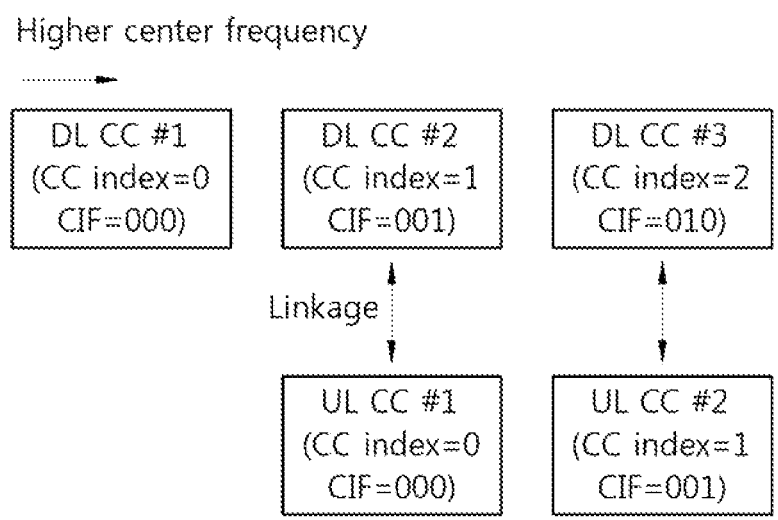
FIG. 10 to FIG. 12 show examples of a method of indexing a UL component carrier (CC).
Figure 11:
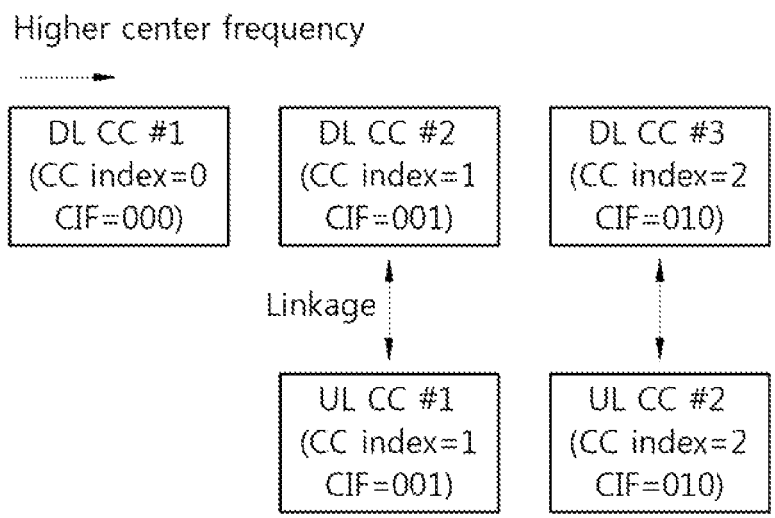
Figure 12:
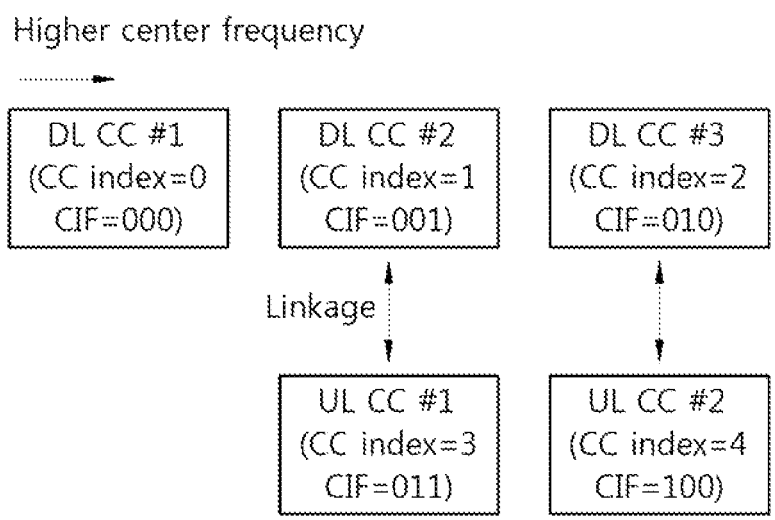

FIG. 10 to FIG. 12 show examples of a method of indexing a UL CC.

Referring to FIG. 10, a UL CC#1 is linked to a DL CC#2, and a UL CC#2 is linked to a DL CC#3. In this case, CC indices 0 to 2 are sequentially assigned to the DL CC#1 to the DL CC#3. A CC index 0 is assigned to the UL CC#1, and a CC index 1 is assigned to the UL CC#2. That is, indices are independently assigned to the DL CC and the UL CC. In this case, the index of the UL CC may overlap with the index of the DL CC.

Referring to FIG. 11, a UL CC#1 is linked to a DL CC#2, and a UL CC#2 is linked to a DL CC#3. CC indices 0 to 2 are sequentially assigned to the DL CC#1 to the DL CC#3. A CC index 1 is assigned to the UL CC#1, and a CC index 2 is assigned to the UL CC#2. That is, the index of the UL CC may have the same index as that of the DL CC linked to the UL CC. In this case, the index of the UL CC may overlap with the index of the DL CC.

Referring to FIG. 12, a UL CC#1 is linked to a DL CC#2, and a UL CC#2 is linked to a DL CC#2. CC indices 0 to 2 are sequentially assigned to the DL CC#1 to the DL CC#3. A CC index 3 is assigned to the UL CC#1, and a CC index 4 is assigned to the UL CC#2. Since the DL CCs have values corresponding to the indices 0 to 2, the CC index assigned to the UL CC starts from 3. That is, the UL CC index is set to a unique value by considering the index of the DL CC. Therefore, the index of the UL CC may have a value not overlapping with the index of the DL CC.

Hereinafter, a method of decoding control information of a UE will be described according to an embodiment of the present invention.

First, a DCI format according to the present invention will be described.

Figure 13:
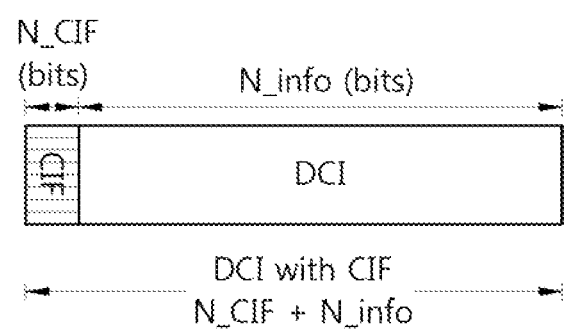
FIG. 13 shows an example of a downlink control information (DCI) format including a carrier indication field (CIF) according to an embodiment of the present invention.

FIG. 13 shows an example of a DCI format including a CIF according to an embodiment of the present invention.

Referring to FIG. 13, the DCI format including the CIF includes N_info information bits, and includes N_CIF CIF bits. In this case, a payload size of the DCI format including the CIF is (N_info+N_CIF) bits. The aforementioned existing DCI format can be reused as the N_info information bits. For example, Table 5 shows the number of bits (in case of including CRC) constituting the N_info information bits with respect to the DCI format.

TABLE 5

| DCI format | number of N_info bits including CRC (for a system bandwidth 50RBs and four antennas at BS) |
|---|---|
| 0 | 42 |
| 1 | 47 |
| 1A | 42 |
| 1B | 46 |
| 1C | 26 |
| 1D | 46 |
| 2 | 62 |
| 2A | 58 |
| 3 | 42 |
| 3A | 42 |

For example, the CIF may consist of 3 bits. The CIF consisting of N_CIF (e.g., 3) bits reports a specific CC of a corresponding DCI to the UE. That is, the CIF indicates a CC to the UE.

Figure 14:
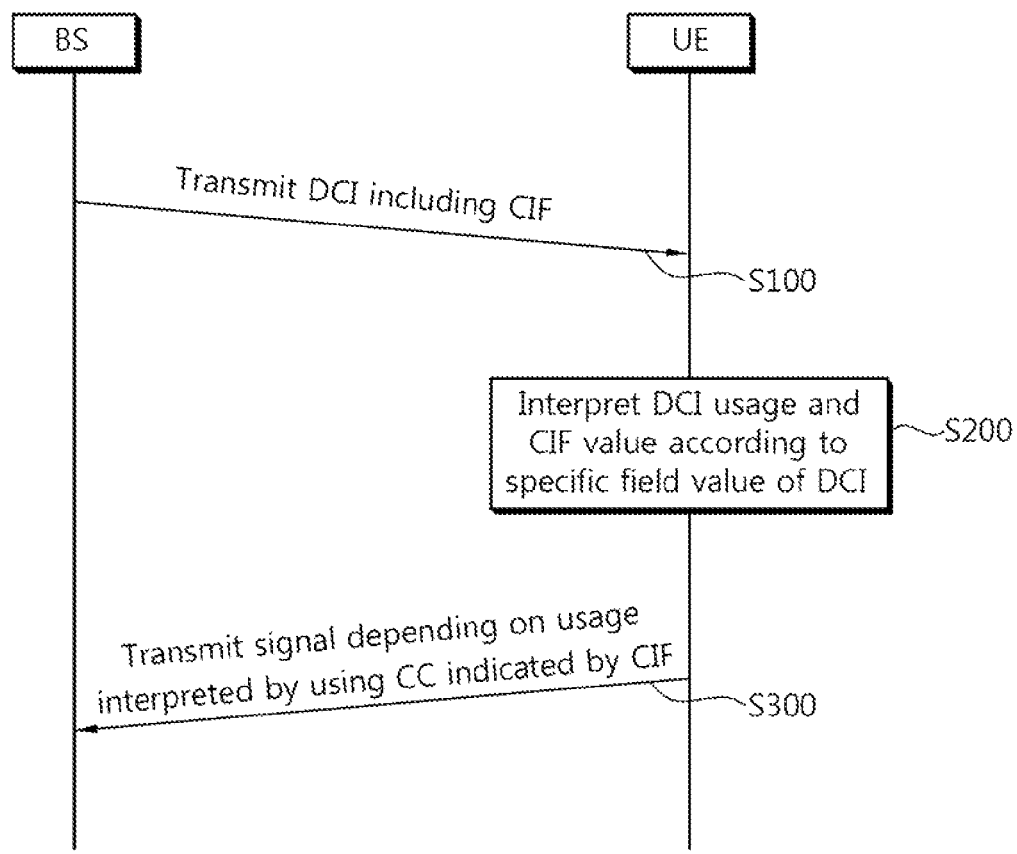
FIG. 14 shows an example of a signaling process between a UE and a BS according to the present invention.

FIG. 14 shows an example of a signaling process between a UE and a BS according to the present invention.

Referring to FIG. 14, the BS transmits downlink control information (DCI) including a CIF to the UE (step S100). The UE interprets a DCI usage and a CIF value according to a specific field value of the DCI (step S200). The UE transmits a signal depending on the usage interpreted by using a CC indicated by the CIF (step S300). Of course, the UE can also receive the signal depending on a usage interpreted by using the CC indicated by the CIF.

Figure 15:
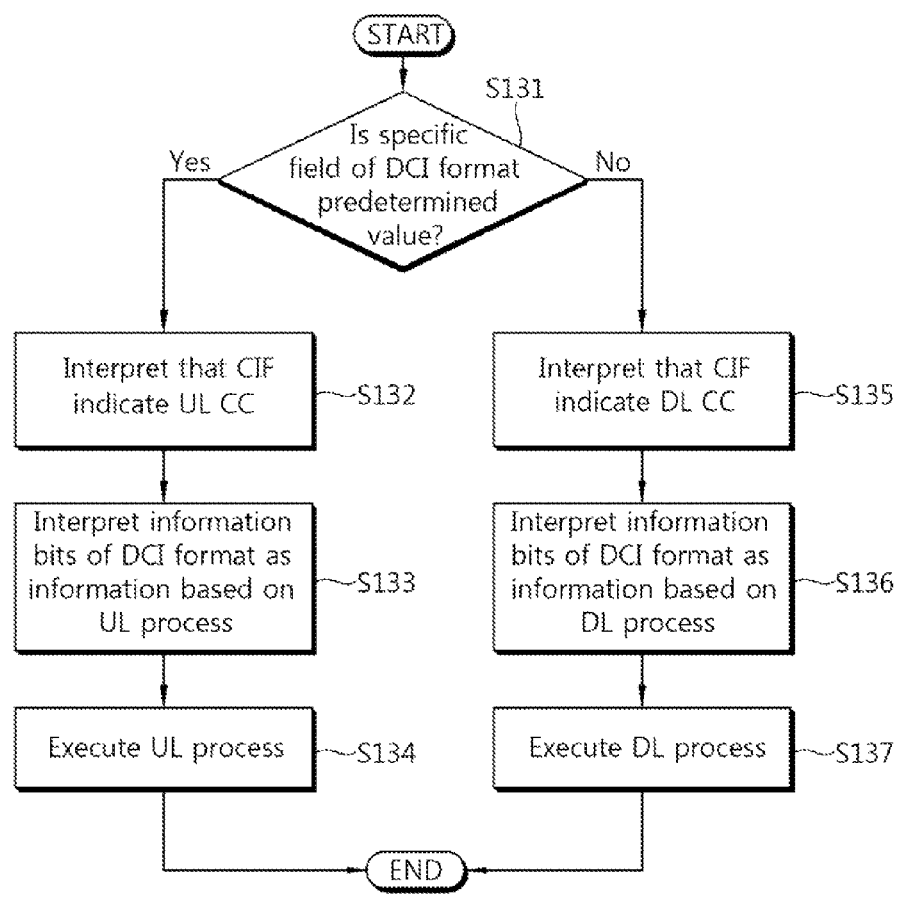
FIG. 15 shows an example in which a UE interprets a CIF value on the basis of a specific field value of DCI and performs a process depending on a usage of the DCI.

FIG. 15 shows an example in which a UE interprets a CIF value on the basis of a specific field value of DCI and performs a process depending on a usage of the DCI.

Referring to FIG. 15, the UE determines whether a specific field of a DCI format including a CIF is a predetermined value (i.e., a first value) (step S131). If the specific field of the DCI format corresponds to the predetermined value, the UE interprets that the CIF indicates a UL CC (step S132). In addition, information bits included in the DCI format are interpreted as information regarding a UL process (step S133). The UE executes the UL process by using the information bits included in the DCI format (step S134).

On the other hand, if the specific field of the DCI format does not correspond to the predetermined value (i.e., the first value), it is interpreted that the CIF indicates a DL CC (step S135). Such an interpretation implies that the specific field of the DCI format has a predetermined second value different from the first value. In addition, the UE interprets the information bits of the DCI format as information regarding a DL process (step S136). The UE executes the DL process by using the information bits included in the DCI format (step S137).

Figure 16:
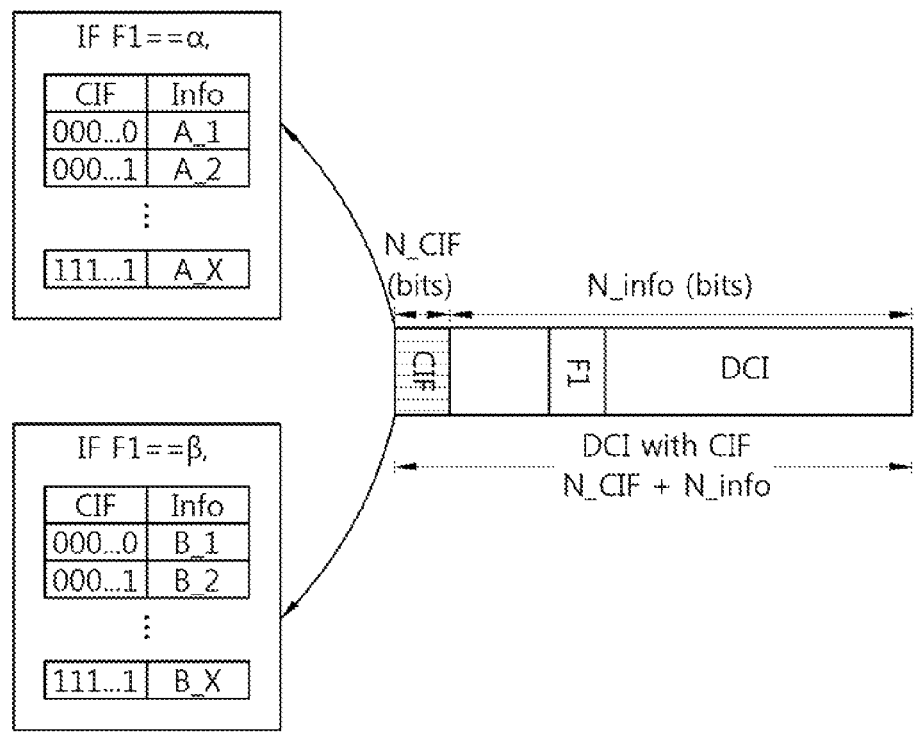
FIG. 16 shows an example in which a UE interprets a CIF value according to a specific field value of a DCI format including a CIF.

FIG. 16 shows an example in which a UE interprets a CIF value according to a specific field value of a DCI format including a CIF.

Referring to FIG. 16, the UE may differently interpret information mapped to the CIF according to a specific field value included in N_info information bits. For example, according to whether a value of a field indicated by "F1" among the N_info information bits is α or β, it can be determined whether a CC indicated by the CIF is a UL CC or a DL CC.

Hereinafter, an example of applying the method of decoding the control information of the UE described above with reference to FIG. 14 to FIG. 16 will be described.

Among the DCI formats, DCI formats 1, 1A, 1B, 1C, 2, and 2A are related to DL transmission, and DCI formats 0, 3, 3A, and 1A are related to UL transmission. The DCI format 1A may be related to any one of the UL and DL transmissions. More specifically, the DCI format 1A can be basically used in compact scheduling for PDSCH transmission for one codeword, or if the following condition is satisfied, can be used to initiate a random access process.

If CRC of the DCI format 1A is scrambled with a unique identifier of the UE, i.e., C-RNTI, and specific fields are configured as described below, then the DCI format 1A can be used to initiate the random access process.

1. A localized/distributed VRB designation flag (1 bit) is set to '0'.

2. The number of bits of a resource block assignment is expressed by Equation 3 below, and all bits thereof are set to '1'.

$$\lceil \log_2(N_{RB}^{DL}(N_{RB}^{DL}+1)/2) \rceil \quad \text{[Equation 3]}$$

In Equation 3 above, $N_{RB}^{DL}$ denotes the number of resource blocks configured in a downlink.

3. Remaining bits other than a preamble index (6 bits) and a PRACH mask index (4 bits) are set to '0'.

If the aforementioned conditions 1 to 3 are satisfied, the information bits of the DCI format 1A including the CIF are interpreted as information for initiating the random access process. In addition, a CC indicated by the CIF is interpreted as a UL CC for initiating the random access process.

The random access process includes a contention-based random access process and a non-contention-based random access process. The contention-based random access process can be performed through steps of: selecting by a UE any one random access preamble from a random access preamble set and transmitting the selected random access preamble to a BS by using a PRACH resource; receiving by the UE a random access response of the UE within a random access response reception window; transmitting by the UE a scheduled message including a random access identifier to the BS; and transmitting a contention resolution message including the random access identifier to the UE after the BS receives the scheduled message.

The non-contention-based access process can be performed through steps of: allocating to the UE a dedicated random access preamble by the BS; transmitting by the UE the dedicated random access preamble to the BS by using the PRACH resource, and receiving by the UE the random access response corresponding to the dedicated random access preamble.

When the aforementioned conditions 1 to 3 are satisfied, the UE interprets that the CIF indicates an index of a UL CC used to initiate the random access process.

If the information bits of the DCI format A do not satisfy the conditions 1 to 3, the UE interprets that a plurality of pieces of information of the DCI 1A are in regards to compact scheduling for PDSCH transmission for one codeword. Further, it is interpreted that the CIF indicates an index of a DL CC on which the PDSCH is transmitted.

Although the DCI format 1A including the CIF is described in the above example, the present invention is not limited thereto. That is, according to a value of a specific field of a DCI format, a CC indicated by a CIF may indicate any one of different DL CCs or may indicate any one of different UL CCs.

Figure 17:
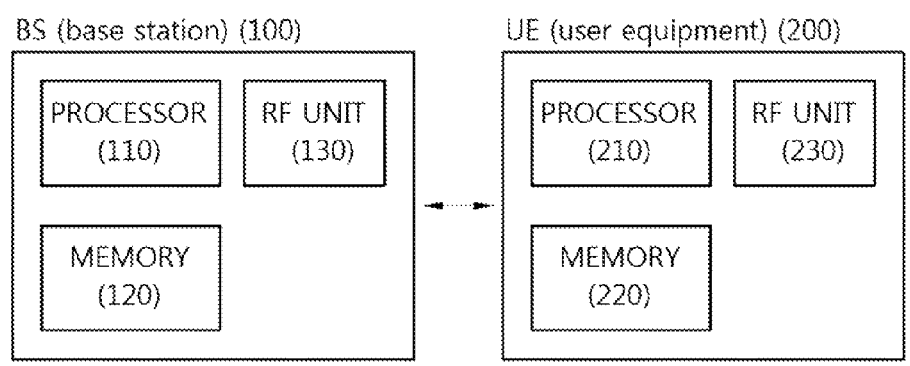
FIG. 17 is a block diagram showing a BS and a UE.

FIG. 17 is a block diagram showing a BS and a UE.

A BS 100 includes a processor 110, a memory 120, and a radio frequency (RF) unit 130. The processor 110 implements the proposed functions, procedures, and/or methods. For example, the processor 110 can report to the UE an index of each CC by using a higher layer signal (e.g., RRC) or a physical layer signal. In addition, the processor 110 can transmit DCI including a carrier indication field to the UE. The memory 120 is coupled to the processor 110, and stores a variety of information for driving the processor 110. The RF unit 130 is coupled to the processor 110, and transmits and/or receives a radio signal.

A UE 200 includes a processor 210, a memory 220, and an RF unit 230. The processor 210 implements the proposed functions, procedures, and/or methods. For example, the processor 210 can receive DCI including a carrier indication field from the BS and can decode the DCI. In this case, the processor 210 determines a CC indicated by a value of the carrier indication field according to a value of a specific field included in the DCI. In addition, the processor 210 performs a DL process or a UL process by using information bits of the DCI. The memory 220 is coupled to the processor 210, and stores a variety of information for driving the processor 210. The RF unit 230 is coupled to the processor 210, and transmits and/or receives a radio signal.

The processors 110 and 210 may include an application-specific integrated circuit (ASIC), a separate chipset, a logic circuit, and/or a data processing unit and/or a converter for mutually converting a baseband signal and a radio signal. The memory 120 and 220 may include a read-only memory (ROM), a random access memory (RAM), a flash memory, a memory card, a storage medium, and/or other equivalent storage devices. The RF units 130 and 230 may include a base-band circuit for processing a radio signal. When the embodiment of the present invention is implemented in software, the aforementioned methods can be implemented with a module (i.e., process, function, etc.) for performing the aforementioned functions. The module may be stored in the memories 120 and 220 and may be performed by the processors 110 and 210. The memories 120 and 220 may be located inside or outside the processors 110 and 210, and may be coupled to the processors 110 and 210 by using various well-known means.

While the present invention has been particularly shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

The invention claimed is:

1. A method of decoding control information of a terminal in a carrier aggregation system, the method comprising:
   receiving downlink control information including a carrier indication field from a base station; and
   decoding the downlink control information,
   wherein the downlink control information includes at least two or more fields, and a component carrier indicated by a value of the carrier indication field is determined according to a value of a specific field among the at least two or more fields.

2. The method of claim 1, wherein the downlink control information is interpreted as information regarding an uplink process or information regarding a downlink process according to the value of the specific field.

3. The method of claim 2, wherein the uplink process is a random access process, and the downlink process is scheduling for one codeword.

4. The method of claim 3,
   wherein the downlink control information includes a cyclic redundancy check, and
   wherein if the cyclic redundancy check is scrambled with an identifier unique to the terminal, and if all fields other than a resource block designating field, preamble index field, and random access channel mask index field included in the downlink control information have a value '0', then the downlink control information is interpreted as information regarding the random access process.

5. The method of claim 4, wherein the identifier unique to the terminal is a cell-radio network temporary identifier (C-RNTI).

6. The method of claim 1, wherein a value of the carrier indication field indicates an uplink component carrier or a downlink component carrier according to the value of the specific field.

7. The method of claim 1, wherein the carrier indication field exists at a predetermined position in the downlink control information.

8. The method of claim 1, wherein the carrier indication field consists of 3 bits.

9. The method of claim 1, further comprising receiving information regarding a size of the downlink control information from the base station through a higher layer signal.

10. The method of claim 1, wherein the terminal performs blind decoding on the downlink control information.

11. A terminal in a carrier aggregation system, comprising:
a radio frequency (RF) unit for transmitting and receiving a radio signal; and
a processor coupled to the RF unit,
wherein the processor is configured for:
receiving downlink control information including a carrier indication field from a base station; and decoding the downlink control information, wherein the downlink control information includes at least two or more fields, and a component carrier indicated by a value of the carrier indication field is determined according to a value of a specific field among the at least two or more fields.

* * * * *